(12) United States Patent
Dunworth et al.

(10) Patent No.: US 8,547,057 B2
(45) Date of Patent: Oct. 1, 2013

(54) SYSTEMS AND METHODS FOR SELECTIVE WIRELESS POWER TRANSFER

(75) Inventors: Jeremy D Dunworth, San Diego, CA (US); Roger Wayne Martin, San Diego, CA (US); MaryBeth Selby, San Jose, CA (US); David Maldonado, Chula Vista, CA (US); Khaled Helmi El-Maleh, San Marcos, CA (US); Yair Karmi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 335 days.

(21) Appl. No.: 12/850,542

(22) Filed: Aug. 4, 2010

(65) Prior Publication Data

US 2011/0115431 A1 May 19, 2011

Related U.S. Application Data

(60) Provisional application No. 61/262,119, filed on Nov. 17, 2009.

(51) Int. Cl.
*H01M 10/46* (2006.01)

(52) U.S. Cl.
USPC .......................................................... 320/108

(58) Field of Classification Search
USPC .................................. 320/107, 108; 307/104
See application file for complete search history.

(56) References Cited

U.S. PATENT DOCUMENTS

| | | | |
|---|---|---|---|
| 6,031,354 | A | 2/2000 | Wiley et al. |
| 6,493,437 | B1 | 12/2002 | Olshansky |
| 7,502,619 | B1 | 3/2009 | Katz |
| 8,169,185 | B2 | 5/2012 | Partovi et al. |
| 2003/0013434 | A1 | 1/2003 | Rosenberg et al. |
| 2003/0034757 | A1 | 2/2003 | Woodnorth |
| 2004/0017181 | A1 | 1/2004 | Sakai |
| 2004/0111360 | A1 | 6/2004 | Albanese |
| 2006/0113955 | A1 | 6/2006 | Nunally |
| 2006/0287763 | A1 | 12/2006 | Ochi et al. |
| 2007/0072474 | A1 | 3/2007 | Beasley et al. |
| 2008/0116847 | A1* | 5/2008 | Loke et al. ............... 320/108 |
| 2008/0122518 | A1 | 5/2008 | Besser et al. |
| 2008/0157603 | A1 | 7/2008 | Baarman et al. |
| 2008/0197802 | A1 | 8/2008 | Onishi et al. |
| 2008/0221986 | A1 | 9/2008 | Soicher et al. |
| 2008/0235332 | A1 | 9/2008 | McChesney et al. |

(Continued)

FOREIGN PATENT DOCUMENTS

| | | |
|---|---|---|
| EP | 1528652 | 5/2005 |
| EP | 1667308 A2 | 6/2006 |

(Continued)

OTHER PUBLICATIONS

International Search Report and Written Opinion—PCT/US2010/057122—ISA/EPO—May 26, 2011.

(Continued)

*Primary Examiner* — Edward Tso
(74) *Attorney, Agent, or Firm* — Knobbe Martens Olson & Bear, LLP

(57) ABSTRACT

Exemplary embodiments are directed to selective wireless power transfer. A method may include transferring wireless power to at least one electronic device while varying at least one parameter of the wireless power transfer according to a wireless power transfer scenario.

30 Claims, 6 Drawing Sheets

(56) References Cited

U.S. PATENT DOCUMENTS

| | | |
|---|---|---|
| 2008/0265835 A1 | 10/2008 | Reed et al. |
| 2009/0058361 A1 | 3/2009 | John |
| 2009/0111492 A1 | 4/2009 | Dudley et al. |
| 2009/0128086 A1 | 5/2009 | Lee |
| 2009/0133733 A1 | 5/2009 | Retti |
| 2009/0215473 A1 | 8/2009 | Hsu |
| 2009/0251309 A1 | 10/2009 | Yamasuge |
| 2009/0327150 A1 | 12/2009 | Flake et al. |
| 2010/0167765 A1 | 7/2010 | Sarmah et al. |
| 2010/0171461 A1* | 7/2010 | Baarman et al. .............. 320/108 |
| 2010/0174629 A1 | 7/2010 | Taylor et al. |
| 2010/0201314 A1* | 8/2010 | Toncich et al. ............... 320/108 |
| 2010/0223136 A1 | 9/2010 | Wormald et al. |
| 2010/0253281 A1* | 10/2010 | Li .................................. 320/108 |
| 2010/0256831 A1 | 10/2010 | Abramo et al. |
| 2010/0276995 A1 | 11/2010 | Marzetta et al. |
| 2010/0323616 A1 | 12/2010 | Von Novak et al. |
| 2011/0082727 A1 | 4/2011 | Macias |
| 2011/0099065 A1 | 4/2011 | Georgis et al. |
| 2011/0115432 A1 | 5/2011 | El-Maleh et al. |
| 2011/0119135 A1 | 5/2011 | Grilli et al. |
| 2011/0119144 A1 | 5/2011 | Grilli et al. |

FOREIGN PATENT DOCUMENTS

| | | |
|---|---|---|
| EP | 1734635 A2 | 12/2006 |
| EP | 2071695 A2 | 6/2009 |
| FR | 2879852 | 6/2006 |
| GB | 2438485 A | 11/2007 |
| WO | WO03009908 A1 | 7/2000 |
| WO | WO0054387 | 9/2000 |
| WO | WO03047064 A2 | 6/2003 |
| WO | WO2004114433 | 12/2004 |
| WO | WO2006127185 A2 | 11/2006 |
| WO | WO2008137996 A1 | 11/2008 |
| WO | WO2009009559 | 1/2009 |
| WO | WO2010036980 A1 | 4/2010 |
| WO | WO2010118161 | 10/2010 |
| WO | WO2011063054 | 5/2011 |

OTHER PUBLICATIONS

Robinson, Stuart. "Wireless Charging Will Quadruple Potential Combined Speed Charging" (Strategy Analytics, Inc.) Jul. 28, 2009.

* cited by examiner

SYSTEMS AND METHODS FOR SELECTIVE WIRELESS POWER TRANSFER

CLAIM OF PRIORITY UNDER 35 U.S.C. §119

This application claims priority under 35 U.S.C. §119(e) to:

U.S. Provisional Patent Application 61/262,119 entitled "WIRELESS POWER" filed on Nov. 17, 2009, the disclosure of which is hereby incorporated by reference in its entirety.

BACKGROUND

1. Field

The present invention relates generally to wireless power, and more specifically, to selective transfer of wireless power.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

As will be appreciated by a person having ordinary skill in the art, wireless charging may be achieved via an unmodulated signal, which allows narrow tuning of a transmitter and a receiver to the same frequency. However, transmission of such narrowband signal may allow any receiver, including unauthorized receivers, in the vicinity of the transmitter, to tune to the same frequency, taking charge and disrupting charging or authorized receivers.

A need exists for providing wireless power to authorized users while restricting access to unauthorized users.

DETAILED DESCRIPTION

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between a transmitter and a receiver without the use of physical electrical conductors.

Figure 1:
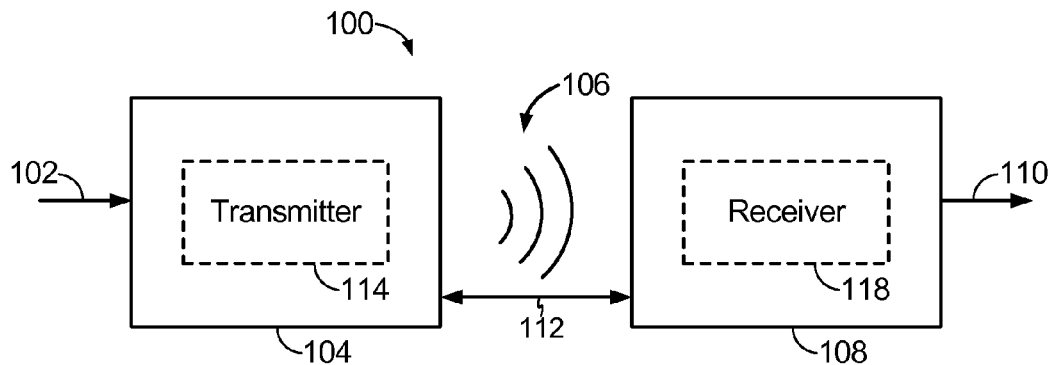
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
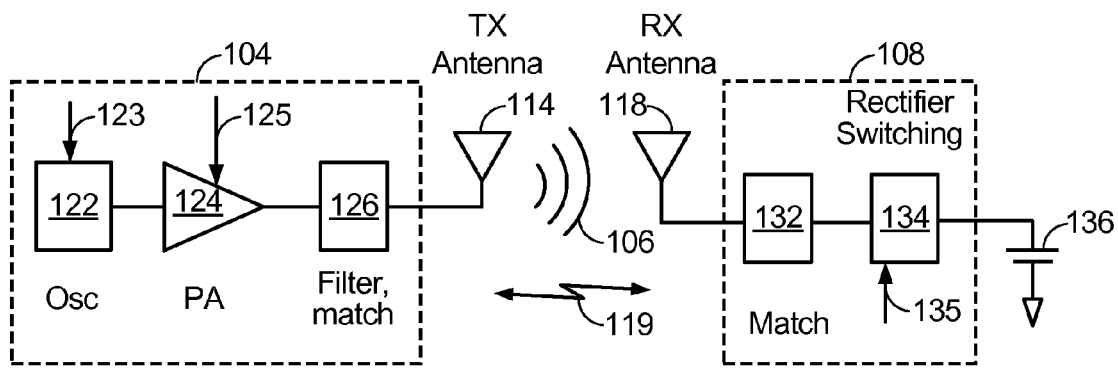
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
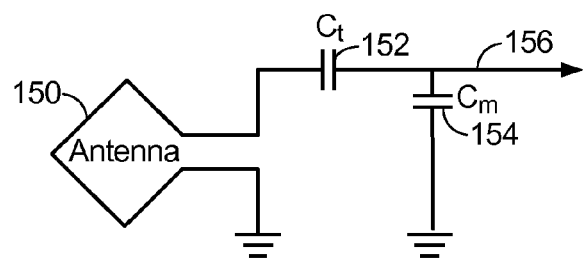
FIG. 3 illustrates a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Figure 4:
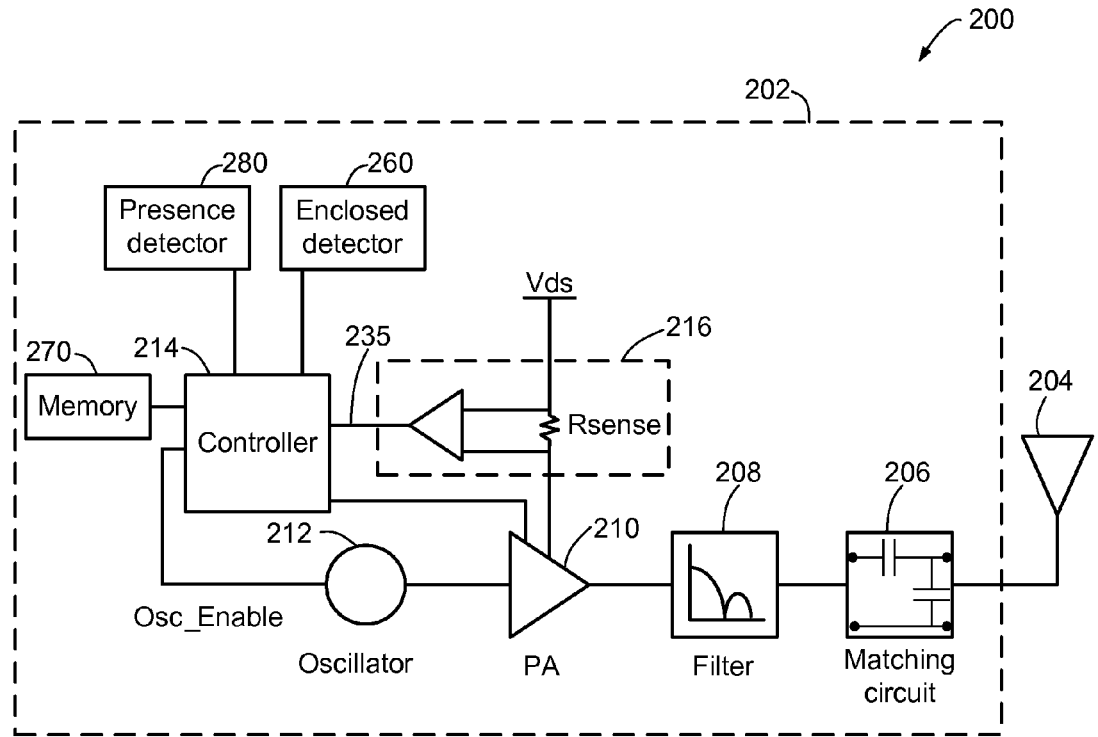
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. It is noted that transmitter 200 may operate at any suitable frequency. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current drawn by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency or phase of the oscillator, and for adjusting the output power level for implementing a communication protocol for interacting with neighboring devices through their attached receivers. As is well known in the art, adjustment of oscillator phase and related circuitry in the transmission path allows for reduction of out of band emissions, especially when transitioning from one frequency to another.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy and to communicate with an active receiver.

Transmit antenna 204 may be implemented with a Litz wire or as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
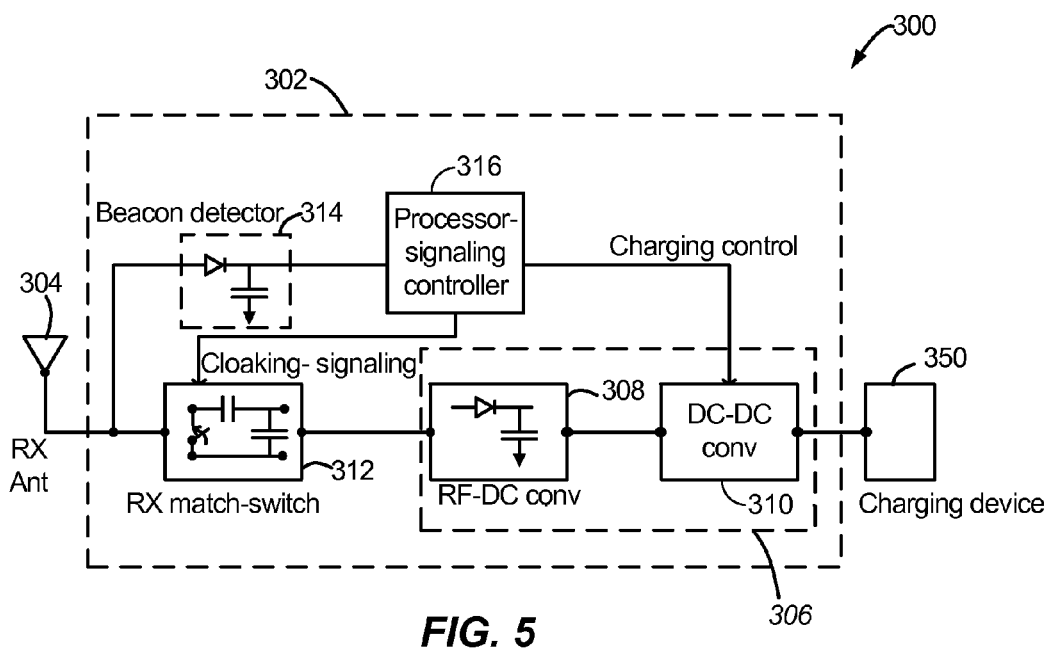
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or within a specified range of frequencies, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 μsec.

In an exemplary embodiment, communication between the transmitter and the receiver refers to a device sensing and charging control mechanism, rather than conventional two-way communication. In other words, the transmitter may use on/off keying of the transmitted signal to adjust whether energy is available in the near-field. The receivers interpret these changes in energy as a message from the transmitter. From the receiver side, the receiver may use tuning and de-tuning of the receive antenna to adjust how much power is being accepted from the near-field. The transmitter can detect this difference in power used from the near-field and interpret these changes as a message from the receiver. It is noted that other forms of modulation of the transmit power and the load behavior may be utilized.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
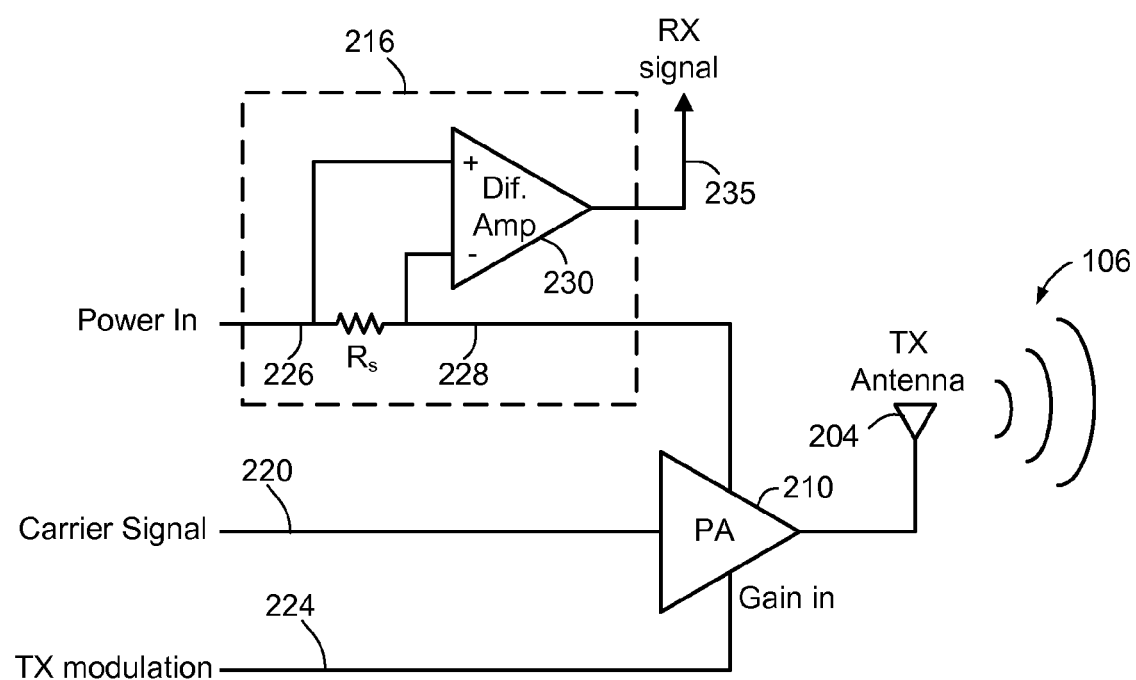
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204. It is noted that other types of modulation may be within the scope of the present invention.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the current consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas. It is noted that other circuit may be implemented to detect variation in the load presented by the behavior of the receive antenna and associated circuitry.

Various exemplary embodiments of the present invention, as described herein, relate to systems, devices, and methods for transferring wireless power to authorized devices while preventing unauthorized devices from receiving wireless power. More specifically, various exemplary embodiments described herein include methods, systems, and devices for transferring wireless power and providing access to the transferred wireless power to one or more electronic devices, which are authorized to receive the wireless power. Other various exemplary embodiments described herein include methods, systems, and devices for receiving wireless power at an authorized electronic device.

More specifically, according to one exemplary embodiment of the present invention, a wireless power device may transmit wireless power, wherein at least one parameter associated with the transmission thereof may vary according to a predefined wireless power transfer scenario. More specifically, for example, the wireless power device may transmit wireless power, wherein at least one parameter associated with the transmission thereof may vary according to pseudo-random sequence. It is noted that the term "wireless power transfer scenario" may include a scenario in which at least one parameter of wireless power transmission (e.g., a frequency of a wireless power transmitter) is varied according to at least one pseudo-random sequence. Stated another way, a "wireless power transfer scenario" may include a scenario in which at least one parameter of wireless power transmission varies according to time-dependent, pre-defined pattern.

Furthermore, to enable an authorized electronic device to receive the wireless power, a receiver associated with the electronic device may operate in accordance with the wireless power transfer scenario. More specifically, for example, an electronic device, which is authorized to receive wireless power, may vary at least one parameter associated with the reception of wireless power (e.g., a frequency of a wireless power receiver) according to a pseudo-random sequence. More specifically, for example, an electronic device, which is authorized to receive wireless power, may vary a frequency of an associated wireless power receiver according to the pseudo-random sequence to enable a resonate frequency of the receiver to match a resonate frequency of a transmitter of a wireless power device.

Moreover, according to one or more other exemplary embodiments of the present invention, the wireless power device may transmit (e.g., via communication means) a code, identifying the wireless power transfer scenario to an electronic device, which is authorized to receiver wireless power from the wireless power device. Upon receipt of the code, the electronic device may be configured to vary the at least one parameter of an associated receiver according to the pseudo-random sequence, and, thus, may enable for wireless power reception.

Figure 7:
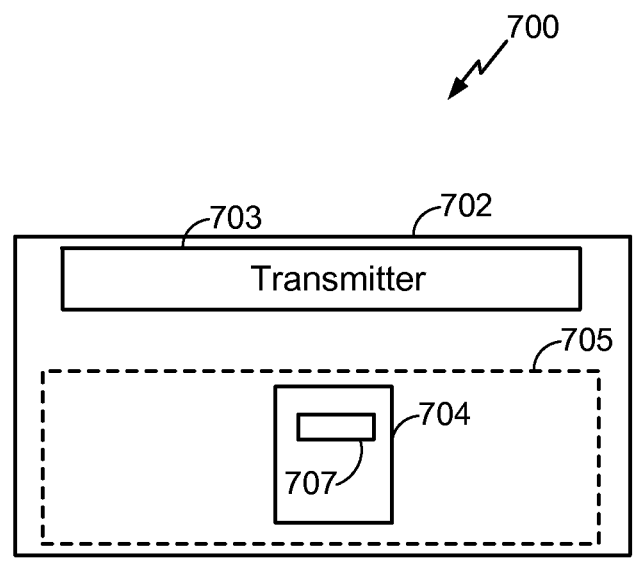
FIG. 7 illustrates a system including a wireless power device and an electronic device, according to an exemplary embodiment of the present invention.

FIG. 7 illustrates a system 700 including a wireless power device 702 having a transmitter 703 and at least one associated transmit antenna 705 configured to transmit wireless power within an associated charging region. System 700 further includes an electronic device 704 having a receiver 707 configured to receive wireless power from a wireless power device, such as wireless power device 702. As one example, wireless power device 702 may transmit a code to electronic device 704, wherein the code identifies a time-dependent pattern in which at least one parameter of an associated transmitter will be varied. Thereafter, wireless power device 702 may transmit wireless power, wherein the at least one parameter of an associated transmitter varies according to the predefined pattern. Stated another way, wireless power device 702 may transmit power according to a unique delivery pattern that is known by electronic device 704, which is authorized to receive wireless power transmitted from wireless power device 702.

Varying a parameter of a transmitter in a pseudo-random sequence may enable one or more receivers, which are in possession of a code identifying the pseudo-random sequence, to track wireless power device 702. Accordingly, one or more devices, which are associated with the one or more receivers that may track at least one parameter of a transmitter of wireless power device, may receiver wireless power from wireless power device 702 while other non-tracking devices may not receive wireless power.

As one example, a frequency of a transmitter may vary according to a pattern (e.g., a secret pattern that is predetermined or dynamically controlled by means of secret algorithms well known in the art), and only devices, which know the pattern and operate according thereto, would be able to control their associated receivers to track the transmitted signal and efficiently draw power from wireless power device 702. By using a range of frequencies, and constantly changing the frequency at which a transmitter resonates, it may be possible to ensure that only electronic devices having receivers that resonate at substantially similar frequencies as the transmitter will be able to draw power wirelessly. It is noted that variations is frequency may also include variations in phase. As is well known in the art, the signal output may correspond to a more generalized transfer function, in which, for example, the method of varying frequency may entail control of the phase. Such control of a transfer function, while supporting the embodiments this invention to transfer power to allowed devices, may provide the additional benefit of reducing out of band emissions.

Furthermore, it is noted that since data may be encrypted, the code identifying the predetermined pattern may be transmitted using traditional wireless communications means, after, for example, a user has subscribed or paid for wireless power service. Exchange or loading of the code may be conducted by methods well known in the art such as pre-loading, challenge response, or local generation from a stored key, usually combined with additional information (e.g. time, position, etc.) that may be supplied from common sources.

According to one exemplary embodiment wireless power device 702 may transmit power upon tuning to a specific frequency (e.g., the first frequency identified in the charging pattern). According to another exemplary embodiment, wireless power device 702 may gradually increase ("ramp up") power transmission using a transition function that may decrease out-of-band power emissions, which an authorized electronic device may not be able to receive. Furthermore, the transfer function may decrease transmission of power that an authorized electronic device may not be able to receive due to synchronization accuracy. More specifically, wireless power device 702 and, more specifically, transmitter 703 associated with wireless power device 702 may emit a low power preamble, which might be a CW or modulated signal, allowing receiver 707 of authorized electronic device 704 to synchronize and tune itself, which may enable the electronic device 704 to receive maximum power when transmitted by wireless power device 702.

Figure 8:
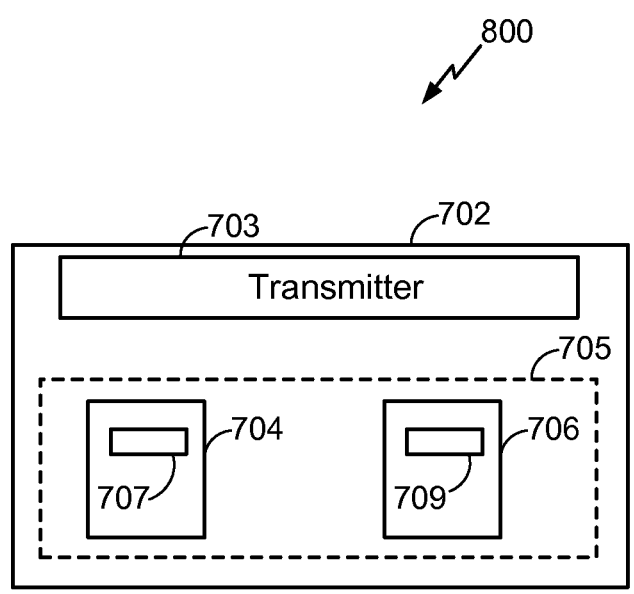
FIG. 8 illustrates a system including a wireless power device and a plurality of electronic devices, in accordance with an exemplary embodiment of the present invention.

FIG. 8 illustrates another system 800 including wireless power device 702 and a plurality of electronic devices 704 and 706, wherein each electronic device 704 and 706 is configured to receive wireless power from a wireless power device, such as wireless power device 702. However, it is noted that in the example illustrated in FIG. 8, electronic device 704 is authorized to receive wireless power from wireless power device 702 while electronic device 706, which includes a receiver 709, is unauthorized. As one example, wireless power device 702 may transmit a code to electronic device 704, wherein the code identifies a time-dependent pattern in which a frequency of transmitter 703 will be varied. Thereafter, wireless power device 702 may transmit wireless power, wherein the frequency of transmitter varies according to the predefined pattern. Furthermore, so long as electronic device 704 varies a frequency of associated receiver 707 according to the predefined pattern identified in the code, electronic device 704 may receive the power wirelessly transmitted from wireless power device 702. Moreover, it is noted that because electronic device 706 lacks information related to the time-dependent pattern, receiver associated with electronic device 706 may not vary its frequency accordingly and, therefore, may not receive any significant portion of the power wirelessly transmitted from wireless power device 702.

In another embodiment, an impedance of transmitter 703 may be varied according to a time-dependent pseudo-random sequence. Furthermore, a receiver (e.g., receiver 707) of an authorized electronic device, which knows time-dependent pseudo-random sequence, may vary its impedance accordingly to remain coupled to transmitter 703 and, therefore, may receive wireless power therefrom. Impedance matching may result in high-efficiency coupling and may effectively displace other receiver coils, which have a lower efficiency. The impedance could be varied in much the same way as the exemplary embodiments described above related to frequency variation. It is noted that according to one exemplary embodiment, only a receiver in possession of the present optimal impedance (i.e., a receiver of an authorized device) would reasonably couple to a transmitter of a wireless power by setting its impedance to an expected optimal value. In another embodiment, one or more receivers, which are not in possession of the optimal value (i.e., receivers of unauthorized devices), may be set to a high impedance, so as not to interfere with the service to other users.

Figure 9:
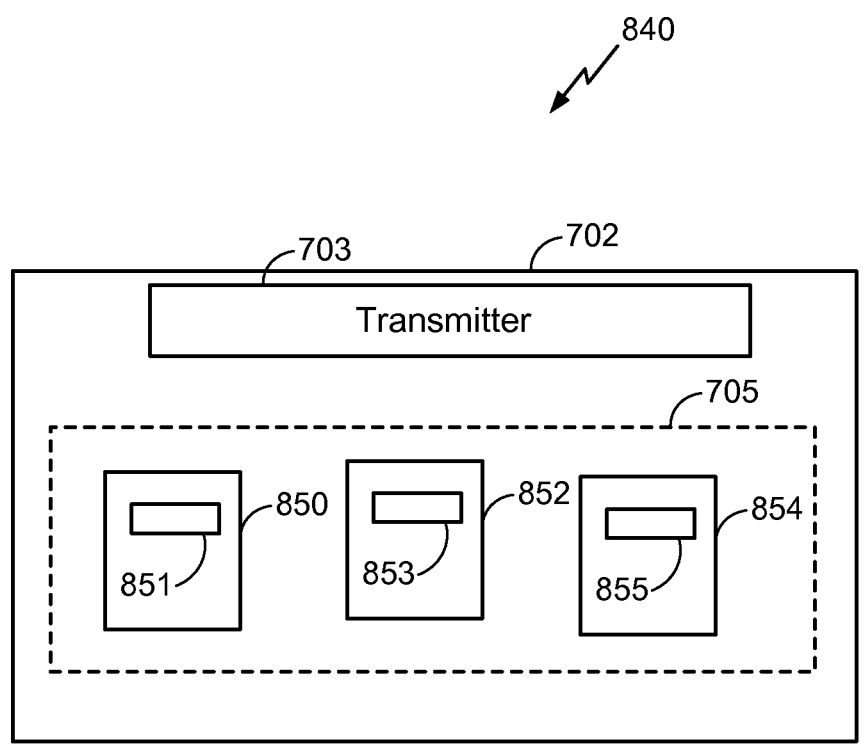
FIG. 9 illustrates another system including a wireless power device and a plurality of electronic devices, according to an exemplary embodiment of the present invention.

Various exemplary embodiments of the present invention may enable for wireless power to be transferred to multiple authorized devices according to a wireless power transfer scenario. FIG. 9 illustrates a system 840 including wireless power device 702 and a plurality of electronic devices 850, 852, and 854, wherein each electronic device are authorized to receive wireless power from wireless power device 702. As an example, with reference to FIG. 9 and Table 1, a wireless power transfer scenario is illustrated wherein wireless power device 702 transfers wireless power across varying frequencies over multiple time periods. More specifically, wireless power device 702 transfers power at frequency F1 during a first time period, at frequency F2 during a second time period, at frequency F3 during a third time period, at frequency F4 during a fourth time period, and so on. Furthermore, as illustrated in Table 1, an associated receiver 851 of an electronic device 850 resonates at frequency F1 during the first time period, at frequency F3 during the third time period, at frequency F5 during a fifth time period, at frequency F7 during a seventh time period, at frequency F9 during a ninth timer period, at frequency F11 during an eleventh time period, at frequency F13 during a thirteenth time period, and at frequency F15 during a fifteenth time period. Accordingly, receiver 851 of electronic device 850 may resonate at the same frequency as transmitter 703 during the first, third, fifth, seventh, ninth, eleventh, thirteenth, and fifteenth time periods.

Moreover, an associated receiver 853 of an electronic device 852 resonates at frequency F2 during a second time period, at frequency F4 during the forth time period, at frequency F8 during a eighth time period, at frequency F10 during a tenth time period, and at frequency F14 during a fourteenth timer period. Accordingly, receiver 853 of electronic device 852 may resonate at the same frequency as transmitter 703 during the second, fourth, eighth, tenth, and fourteenth time periods. In addition, an associated receiver 855 of an electronic device 854 resonates at frequency F6 during a sixth time period and at frequency F12 during a twelfth time period. Accordingly, receiver 855 of electronic device 854 may resonate at the same frequency as transmitter 703 during the sixth and twelfth time period.

ance Z7 during a seventh time period, at impedance Z9 during a ninth timer period, at impedance Z11 during an eleventh time period, at impedance Z13 during a thirteenth time period, and at impedance Z15 during a fifteenth time period. Accordingly, receiver 851 of electronic device 850 may with operate with the same impedance as transmitter 703 during the first, third, fifth, seventh, ninth, eleventh, thirteenth, and fifteenth time periods.

In addition, an associated receiver 855 of an electronic device 854 operates with impedance Z6 during a sixth time period and with impedance Z12 during a twelfth time period. Accordingly, receiver 855 of electronic device 854 may operate with the same impedance as transmitter 703 during the sixth and twelfth time period. Moreover, an associated

TABLE 1

| Device | Frequency | | | | | | | | | | | | | | |
|---|---|---|---|---|---|---|---|---|---|---|---|---|---|---|---|
| Wireless power device 702 | F1 | F2 | F3 | F4 | F5 | F6 | F7 | F8 | F9 | F10 | F11 | F12 | F13 | F14 | F15 |
| Receiver 851 | F1 | | F3 | | F5 | | F7 | | F9 | | F11 | | F13 | | F15 |
| Receiver 853 | | F2 | | F4 | | | | F8 | | F10 | | | | F14 | |
| Receiver 855 | | | | | | F6 | | | | | | F12 | | | |

As a result, power that is delivered by wireless power device 702 is received approximately one-half of the time by electronic device 850 (e.g., three times out of every six cycles), approximately one-third of the time by electronic device 852 (two times out of every six cycles) and approximately one-sixth of the time by electronic device 854 (one time out of every six cycles).

As another example, with reference to FIG. 9 and Table 2, a wireless power transfer scenario is illustrated wherein wireless power device 702 transfers wireless power across varying impedances over multiple time periods. More specifically, wireless power device 702 may operate at impedance Z1 during a first time period, at impedance Z2 during a second time period, at impedance Z3 during a third time period, at impedance Z4 during a fourth time period, and so on. Furthermore, as illustrated in Table 2, an associated receiver 851 of an electronic device 850 resonates at impedance Z1 during the first time period, at impedance Z3 during the third time period, at impedance Z5 during a fifth time period, at impedreceiver 853 of an electronic device 852 operates with impedance Z2 during a second time period, with impedance Z4 during the forth time period, with impedance Z8 during a eighth time period, with impedance Z10 during a tenth time period, and with impedance Z14 during a fourteenth timer period. Accordingly, receiver 853 of electronic device 852 may operate with the same impedance as transmitter 703 during the second, fourth, eighth, tenth, and fourteenth time periods.

TABLE 2

| Device | Impedance | | | | | | | | | | | | | | |
|---|---|---|---|---|---|---|---|---|---|---|---|---|---|---|---|
| wireless power device 702 | Z1 | Z2 | Z3 | Z4 | Z5 | Z6 | Z7 | Z8 | Z9 | Z10 | Z11 | Z12 | Z13 | Z14 | Z15 |
| Receiver 851 | Z1 | | Z3 | | Z5 | | Z7 | | Z9 | | Z11 | | Z13 | | Z15 |
| Receiver 853 | | Z2 | | | | | | Z8 | | | | | | Z14 | |
| Receiver 855 | | | | Z4 | | Z6 | | | | Z10 | | Z12 | | | |

As a result, power that is delivered by wireless power device 702 is received approximately one-half of the time by electronic device 850 (e.g., three times out of every six cycles), approximately one-sixth of the time by electronic device 852 (one time out of every six cycles) and approximately one-third of the time by electronic device 854 (two times out of every six cycles).

With reference to FIG. 8 and Table 3, another wireless power transfer scenario is illustrated wherein wireless power device 702 transfers wireless power across varying frequencies (i.e., frequency F1-frequency F4) over multiple time periods. Moreover, a frequency at which receiver 707 resonates tracks the frequency at which wireless power device 702 resonates. Accordingly, receiver 707 may receive power in each time period. In addition, receiver 709, which is associated with an unauthorized device, is resonating at frequency F2 for each time period. Accordingly, receiver 709 may receive wireless power during the time periods in which wireless power device 702 is resonating at frequency F2.

TABLE 3

| Device | Frequency | | | | | | | |
|---|---|---|---|---|---|---|---|---|
| Wireless power device 702 | F1 | F2 | F3 | F4 | F1 | F2 | F3 | F4 |
| Receiver 707 | F1 | F2 | F3 | F4 | F1 | F2 | F3 | F4 |
| Receiver 709 | F2 | F2 | F2 | F2 | F2 | F2 | F2 | F2 |

As noted above, receiver 709, which is associated with an unauthorized device, is resonating at frequency F2 and, therefore, may receive wireless power during a time period in which wireless power device 702 is resonating at frequency F2. Accordingly, wireless power intended for receiver 707 may be received by receiver 709 and, thus, the amount of power received by receiver 707 may be reduced. The energy lost to such an unauthorized device may be reduced by various means. In one exemplary embodiment, the interference (i.e., loading) created by an unauthorized device may be avoided by detecting the loading and modifying the frequency sequence so as to avoid the frequency at which the loading occurs. For example, with reference to Table 4, wireless power device 702 may avoid transmitting power at frequency F2 and, therefore, receiver 709, which is unauthorized and resonating at frequency F2, may not receive wireless power from wireless power device 702.

TABLE 4

| Device | Frequency | | | | | | | |
|---|---|---|---|---|---|---|---|---|
| Wireless power device 702 | F1 | F3 | F4 | F5 | F1 | F3 | F4 | F5 |
| Receiver 707 | F1 | F3 | F4 | F5 | F1 | F3 | F4 | F5 |
| Receiver 709 | F2 | F2 | F2 | F2 | F2 | F2 | F2 | F2 |

In another exemplary embodiment, before starting wireless power transmission on any frequency, or after one or more time intervals that may be equally or unequally spaced, the loading at the present frequency is tested, and if indication of unauthorized loading is found, the transmitted power is reduced, or transmission is switched to another frequency. This exemplary embodiment may require that both a transmitter and a receiver of an authorized device switch to a commonly known frequency, which may be a backup to the original frequency.

It is noted that the code, which may identify a particular wireless power transfer scenario, or another code may be used for authentication and authorization of an electronic device. For example, an electronic device in the vicinity of a wireless power device could identify itself or be identified by the wireless power device. Moreover, the wireless power device may be configured to access a central server or network to request charging authorization for the electronic device. Upon receiving authorization, the electronic device may be provided information relating to the wireless power transfer scenario.

In accordance with another exemplary embodiment, a wireless communication may be broadcast at the same time as the wireless power, and a controller coupled to a receiver, after receiving the communications, may determine whether the receiver is authorized to receive wireless power. If the receiver is not authorized to receiver wireless power, the controller may be configured to prevent the receiver from resonating at the correct frequency to receive power.

Figure 10:
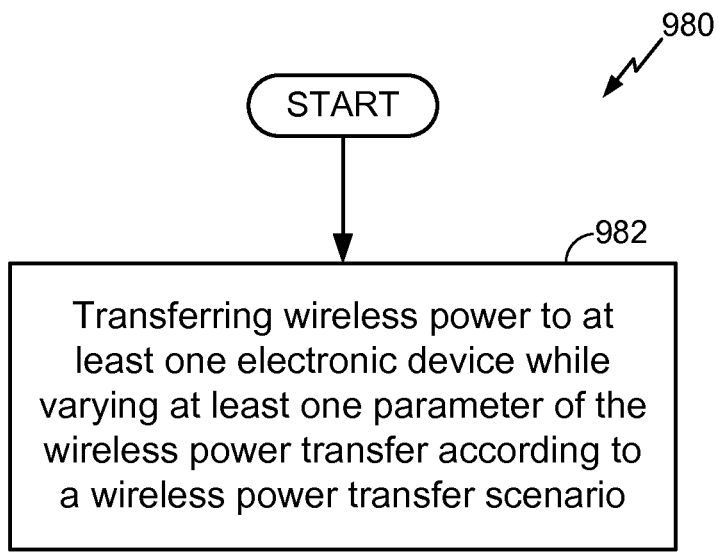
FIG. 10 is a flowchart illustrating a method, in accordance with an exemplary embodiment of the present invention.

FIG. 10 is a flowchart illustrating a method 980, in accordance with one or more exemplary embodiments. Method 980 may include transferring wireless power to at least one electronic device while varying at least one parameter of the wireless power transfer according to a wireless power transfer scenario (depicted by numeral 982).

Figure 11:
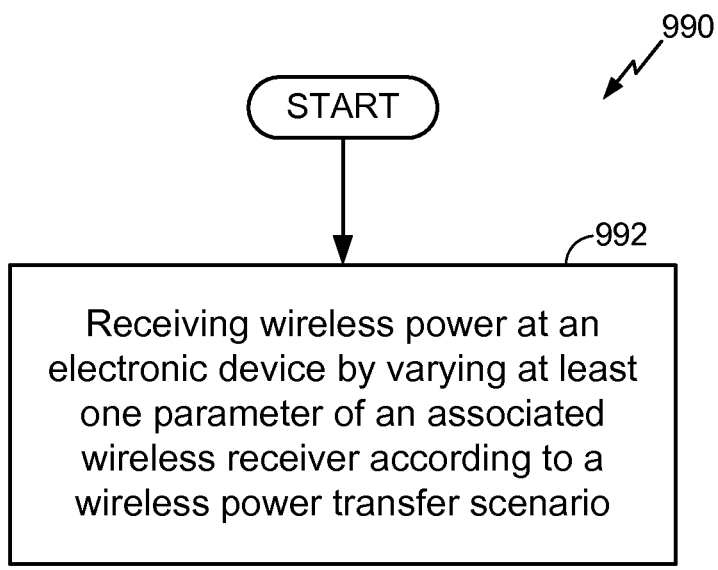
FIG. 11 is a flowchart illustrating another method, in accordance with an exemplary embodiment of the present invention.

FIG. 11 is a flowchart illustrating another method 990, in accordance with one or more exemplary embodiments. Method 990 may include receiving wireless power at an electronic device by varying at least one parameter of a wireless receiver of the electronic device according to a wireless power transfer scenario (depicted by numeral 992).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. A method for charging an electronic device, comprising:
   transferring wireless power to at least one electronic device;
   varying at least one parameter of the wireless power transfer according to a wireless power transfer scenario; and
   transmitting an information signal identifying the at least one parameter of wireless power transmission to be varied according to the wireless power transfer scenario to one or more electronic devices.

2. The method of claim 1, wherein varying at least one parameter of the wireless power transfer according to a wireless power transfer scenario comprises varying the at least one parameter of the wireless power transfer according to pseudo-random sequence.

3. The method of claim 1, wherein varying at least one parameter of the wireless power transfer according to a wireless power transfer scenario comprises varying the at least one parameter of the wireless power transfer according to time-dependent pattern.

4. The method of claim 1, wherein transmitting an information signal comprises transmitting an encrypted code identifying the at least one parameter of wireless power transmission to be varied according to the wireless power transfer scenario.

5. The method of claim 1, wherein varying at least one parameter of the wireless power transfer comprises varying at least one of a frequency and an impedance of wireless power transmission.

6. The method of claim 1, wherein transferring wireless power comprises utilizing a transfer function to decrease out-of-band power emissions.

7. A device for charging an electronic, comprising:
   a wireless power transmitter, said wireless power transmitter configured to;
   transmit wireless power,
   vary at least one parameter of the wireless power transmission according to a wireless power transfer scenario, and
   transmit an information signal identifying the at least one parameter of wireless power transmission to be varied according to the wireless power transfer scenario to one or more electronic devices.

8. The device of claim 7, wherein the wireless power transfer scenario comprises a time-dependent pattern.

9. The device of claim 7, wherein the wireless power transmitter is configured to vary at least one of a frequency and an impedance of the wireless power transmission.

10. A method for charging an electronic device, comprising:
    receiving wireless power at an electronic device;
    by varying at least one parameter of a wireless receiver of the electronic device according to a wireless power transfer scenario; and
    receiving an information signal identifying the at least one parameter and a sequence at which the at least one parameter is varied.

11. The method of claim 10, wherein varying at least one parameter of a wireless receiver of the electronic device according to a wireless power transfer scenario comprises varying at least one parameter of a wireless receiver of the electronic device according to a pseudo-random sequence.

12. The method of claim 10, wherein varying at least one parameter of a wireless receiver of the electronic device according to a wireless power transfer scenario comprises varying at least one parameter of a wireless receiver of the electronic device according to a time-dependent pattern.

13. The method of claim 10, wherein receiving an information signal comprises receiving an encrypted code identifying the at least one parameter and a pseudo-random sequence at which the at least one parameter is varied.

14. The method of claim 10, wherein varying at least one parameter comprises varying at least one of a frequency at which the wireless receiver resonates and an impedance of the wireless receiver.

15. The method of claim 10, wherein varying at least one parameter comprises varying at least one parameter of a wireless receiver to match an associated at least one parameter of a wireless power transmitter.

16. A device for charging an electronic device, comprising:
a wireless power receiver, said wireless power receiver configured to:
receive wireless power,
vary at least one parameter thereof according to a sequence, and receive an information signal identifying the at least one parameter and the sequence at which the at least one parameter is varied.

17. The device claim 16, wherein the device is configured to vary at least one of a frequency at which the wireless power receiver resonates and an impedance of the wireless power receiver.

18. A device for charging an electronic device, comprising:
means for transmitting an information signal identifying a wireless power transfer scenario;
means for transmitting wireless power; and
means for varying at least one parameter of an associated wireless transmitter according to the wireless power transfer scenario.

19. A device for charging an electronic device, comprising:
means for receiving an information signal identifying a wireless power transfer scenario;
means for receiving wireless power; and
means for varying at least one parameter of an associated wireless receiver according to the wireless power transfer scenario.

20. The method of claim 10, wherein the sequence comprises a pseudo-random sequence.

21. The device of claim 16, wherein the sequence comprises a pseudo-random sequence.

22. The device of claim 18, wherein means for varying at least one parameter of an associated wireless transmitter according to the wireless power transfer scenario comprises means for varying the at least one parameter of the wireless power transfer according to pseudo- random sequence.

23. The device of claim 18, wherein means for varying at least one parameter of an associated wireless transmitter according to the wireless power transfer scenario comprises means for varying the at least one parameter of the wireless power transfer according to time-dependent pattern.

24. The device of claim 18, wherein means for transmitting an information signal comprises means for transmitting an encrypted code identifying the at least one parameter of wireless power transmission to be varied according to the wireless power transfer scenario.

25. The device of claim 18, wherein means for varying at least one parameter of an associated wireless transmitter according to the wireless power transfer scenario comprises means for varying at least one of a frequency and an impedance of wireless power transmission.

26. The device of claim 19, wherein means for varying at least one parameter of an associated wireless receiver according to the wireless power transfer scenario comprises means for varying at least one parameter of a wireless receiver of the electronic device according to a pseudo-random sequence.

27. The device of claim 19, wherein means for varying at least one parameter of an associated wireless receiver according to the wireless power transfer scenario comprises means for varying at least one parameter of a wireless receiver of the electronic device according to a time-dependent pattern.

28. The device of claim 19, wherein means for receiving an information signal comprises means for receiving an encrypted code identifying the at least one parameter and a pseudo-random sequence at which the at least one parameter is varied.

29. The device of claim 19, wherein means for varying at least one parameter of an associated wireless receiver according to the wireless power transfer scenario comprises means for varying at least one of a frequency at which the wireless receiver resonates and an impedance of the wireless receiver.

30. The device of claim 19, wherein means for varying at least one parameter of an associated wireless receiver according to the wireless power transfer scenario comprises means for varying at least one parameter of a wireless receiver to match an associated at least one parameter of a wireless power transmitter.

* * * * *